(12) United States Patent
Frantzeskakis et al.

(10) Patent No.: US 12,335,003 B2
(45) Date of Patent: Jun. 17, 2025

(54) DISTRIBUTED DIGITAL BEAMFORMING

(71) Applicant: Argo Semiconductors SA, Hellinikon (GR)

(72) Inventors: Emmanouil Frantzeskakis, Athens (GR); Georgios Sfikas, Athens (GR); Konstantinos Vryssas, Athens (GR)

(73) Assignee: Argo Semiconductors SA, Hellinikon (GR)

( * ) Notice: Subject to any disclaimer, the term of this patent is extended or adjusted under 35 U.S.C. 154(b) by 121 days.

(21) Appl. No.: 17/823,855

(22) Filed: Aug. 31, 2022

(65) Prior Publication Data

US 2023/0080401 A1   Mar. 16, 2023

Related U.S. Application Data

(60) Provisional application No. 63/243,158, filed on Sep. 12, 2021.

(51) Int. Cl.
*H04B 7/06* (2006.01)
*H04B 7/0413* (2017.01)
*H04B 7/08* (2006.01)

(52) U.S. Cl.
CPC ......... *H04B 7/0617* (2013.01); *H04B 7/0413* (2013.01); *H04B 7/0897* (2013.01)

(58) Field of Classification Search
CPC ............... H04B 7/0617; H04B 7/0413; H04B 7/0897
USPC .......................................................... 375/262
See application file for complete search history.

(56) References Cited

U.S. PATENT DOCUMENTS

| | | | | |
|---|---|---|---|---|
| 9,640,866 | B2* | 5/2017 | Kumar | H04B 7/088 |
| 2005/0024540 | A1* | 2/2005 | Kim | H04B 7/0851 |
| | | | | 348/614 |
| 2015/0078472 | A1* | 3/2015 | Vook | H04B 7/0617 |
| | | | | 375/267 |
| 2019/0140709 | A1* | 5/2019 | Guerra | H04B 7/0421 |
| 2020/0068570 | A1* | 2/2020 | Khan | H04B 1/0475 |
| 2022/0312404 | A1* | 9/2022 | Chopra | H04W 72/044 |

FOREIGN PATENT DOCUMENTS

WO   WO-2022099230 A1 *   5/2022   ............ H04W 48/18

* cited by examiner

*Primary Examiner* — Leila Malek
(74) *Attorney, Agent, or Firm* — M&B IP Analysts, LLC

(57) ABSTRACT

A RU for mMIMO has M antenna branches; a plurality of partial digital beamforming (PDBF) processors, each PDBF processor receiving a transmit vector comprising values for each of L data layers to be transmitted at time t from the RU via the antenna branches, wherein each of the plurality of PDBF processors performs a beamforming operation on the vector by multiplying the vector with each of a plurality of respective weight vectors that are a subset of a received weight array, to produce scalar values, each scalar value corresponding to one of the weight vectors and being supplied to a respective antenna branch; wherein the number of scalar values produced by any particular one of the PDBF processors equals the number of weight vectors used in each PDBF processor and the number of scalar values produced is equal to M; where L and M are greater than one.

19 Claims, 3 Drawing Sheets

DISTRIBUTED DIGITAL BEAMFORMING

CROSS-REFERENCE TO RELATED APPLICATIONS

This application claims benefit of U.S. provisional patent application Ser. No. 63/243,158, filed Sep. 12, 2021, which is herein incorporated by reference.

TECHNICAL FIELD

This invention relates to a communications system featuring digital beamforming, and more particularly, to such a communications system applying digital beamforming for use with massive multiple-input and multiple-output, (mMIMO) technology.

BACKGROUND

Massive multiple input and multiple output (mMIMO) technology, is considered, as of this writing, as typically employing 16 antennas or more for wireless communication, whereas most commonly used are arrays of 32 and 64 antennas. Massive MIMO, by using a large number of antennas is able to support two or more users at one time instant, using the same frequency, which may be achieved by pointing an individual beam at each user. mMIMO is expected to be a major contributor to the expected success of fifth generation wireless technology (5G) as it promises to provide better exploitation of the space dimension in service of increasing wireless network capability. Herein, the term 5G is meant to refer to the next generation of mobile networks as specified by the International Telecommunications Union-Radio communications sector (ITU-R) and/or the 3rd Generation Partnership Project (3GPP), which is well known to those of ordinary skill in the art.

In some implementations of multiple input and multiple output (MIMO) technology, spatial exploitation may be achieved through the pointing of an electromagnetic beam at each user. However, mMIMO requires extensive beamforming operations which in turn require the processing of large amount of data and the formed beams are transmitted or received via dense antenna panels or antenna arrays.

Practical implementation of mMIMO requires the resolution of many problems. From a technical point of view, the beamforming operations rely on banks of radios that typically consume large amounts of power and produce excessive heating. As a result, powerful cooling systems are needed. The need for such cooling systems increases the size and weight requirements at the towers on which the antennas are mounted. In addition, mMIMO imposes high costs for the base stations because a large number of active components are required.

The high costs for such systems have come to necessitate the use of small antenna panels which are only able to form relatively thick communication beams and consequently performance suffers due to resulting interference.

Originally, beamforming was implemented using analog circuits requiring large antenna arrays at high cost and requiring bulky construction, as noted. By contrast, digital implementations of the beamforming enable a more compact solution that employs smaller antenna arrays since the digital beamforming arrangements allow the reuse of the antenna elements by multiple beams. However, as currently arranged, digital implementations of beamforming require extremely powerful digital signal processors.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a radio unit for massive multiple input and multiple output (mMIMO) communications. The radio unit comprises M antenna branches; a plurality of partial digital beamforming (PDBF) processors, each of the partial digital beamforming processors receiving a transmit vector comprising values for each of L data layers, to be transmitted for a time t from the radio unit via the antenna branches, wherein each of the plurality of partial digital beamforming processors performs a beamforming operation on the vector by multiplying the vector with each of a plurality of respective weight vectors, the weight vectors each being a subset of a received weight array, to produce a plurality of scalar values, each of the scalar values corresponding to one of the weight vectors and being supplied to a respective one of the antenna branches; wherein a number of the plurality of scalar values produced by any particular one of the partial digital beamforming processors is equal to a number of the plurality of weight vectors by which the transmit vector is multiplied in the particular one of the partial digital beamforming processors and a total number of scalar values produced is equal to M; and wherein L and M are each an integer greater than one.

Certain embodiments disclosed herein include a radio unit for massive multiple input and multiple output (mMIMO) communications. The radio unit comprises M antenna branches; a plurality of partial digital beamforming (PDBF) processors, each of the partial digital beamforming processors receiving (i) a plurality of antenna branch values, each of the antenna branch values being derived from a respective one of the M antenna branches, and (ii) a plurality of respective weight vectors, the weight vectors having a dimension L and each weight vector being a respective subset of a received weight array, to produce a vector of L weighted values for each of the received antenna branch values, wherein each of the PDBF processors adds each of the vector of L weighted values it produced to generate a per PDBF processor vector that has L weighted values; wherein L and M are each an integer greater than one.

DETAILED DESCRIPTION

Figure 1:
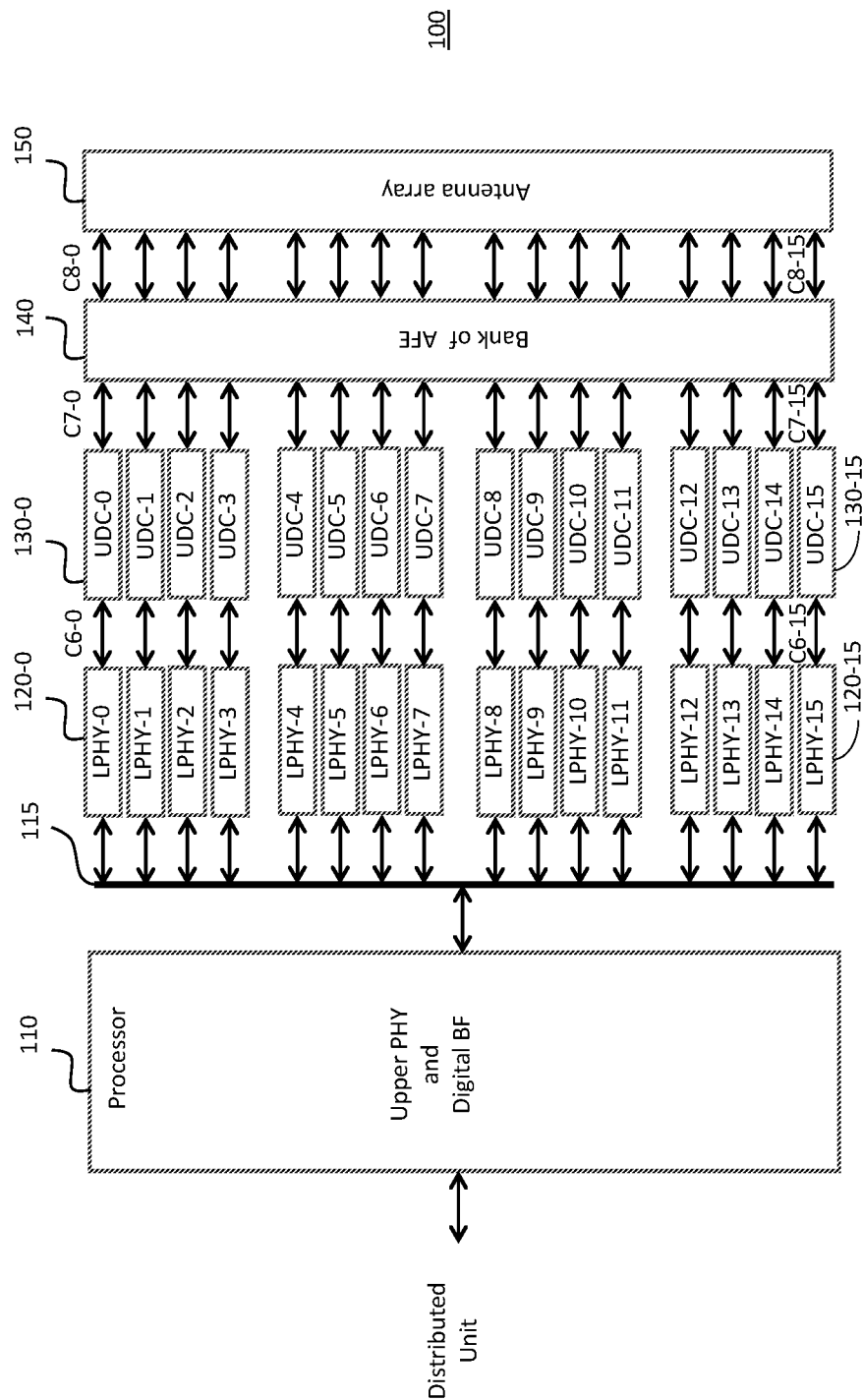
FIG. 1 shows a prior art radio unit (RU) for use in a communications system that uses centralized digital beamforming.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The present invention provides the means for implementing a digital beamforming system in a computationally distributed manner in which the digital beamforming is achieved by employing multiple, but less powerful, processors, as compared to the single processor employed in prior art beamforming arrangements. This enables, advantageously, a more economical wireless system as compared to prior art systems that implement centralized beam forming on a single processor.

FIG. 1 shows a prior art radio unit (RU) 100 for use in a communications system that uses centralized digital beamforming. Shown in FIG. 1 are a) upper physical layer and digital beamformer 110, also referred to as processor 110, b) communications interface 115, (c) low physical layer (LPHY) processors 120-0 through 120-15, collectively herein LPHY processors 120, (d) frequency up/down converters (UDC) 130-0 through 130-15, collectively herein UDCs 130, (e) bank of analog front end (AFE) units 140, and (f) antenna array 150.

Processor 110 is used for interfacing a multitude of L data streams between RU 100 and an external distributed unit (DU) (not shown). The L data streams may also be referred to herein as layers and from them, in the transmit direction, i.e., from distributed unit to antenna array 150, there will be produced different electromagnetic beams for transmission from RU 100. Conversely, in the receive direction, i.e., from antenna array 150 to the distributed unit, L data streams will be developed from the signals received at antenna array 150. In some embodiments, at least two of the L data streams may relate to different users. In some embodiments, where at least two of the L streams relate to different users, each of the different users may be targeted by a beam directed at that user. In some embodiments, there may be up to L such beams.

The DU is well known in the art, e.g., as defined by 3GPP which specifies that there be a distributed unit and a radio unit. The distributed unit has a protocol stack, e.g., providing support for the lower layers of the protocol stack such as radio link control (RLC), media access control (MAC) and physical layer, and performs protocol functions. The distributed unit also creates the weights employed herein, e.g., as specified by 3GPP and Open Radio Access Network (ORAN). There is a communication protocol implemented between the DU and RU 100. Communication between the DU and the RU may be around 25 Gbps, which is considered to be "fast" in the context of communication herein. The DU may be a physically distinct device from RU 100 and may be located at a remote location from RU 100.

In the transmit direction, processor 110 performs upper physical layer (upper PHY) operations. In this regard, it will be appreciated by those of ordinary skill in the art, that a 5G system is based on orthogonal frequency division multiplexing (OFDM) and has processing required in the frequency domain and also processing required in the time domain. The processing for the time domain is effectively closer to the actual physical channel and hence is referred to as the lower physical layer (lower PHY) operations while the frequency domain operations are effectively further removed from the actual physical channel and so are referred to as the upper physical layer. As such, in the transmit direction, the upper PHY operations are performed first and are then followed by the lower PHY, while in the receive direction the lower PHY operations are performed first and then followed by the upper PHY operations. Such terminology appears in the 5G standard and ORAN discussions. The upper PHY may include various baseband modem operations while the lower PHY includes digital predistortion (DPD), crest factor improvement (CFR), and filtering.

More specifically, processing by upper PHY and digital beamformer 110 may perform frequency domain operations of an OFDM modem on the L layers received from the DU and it applies digital beamforming to produce a vector of beamformed samples of length M, the value of M being dictated by the number of antenna elements in antenna array 150 of RU 100. The individual antenna elements antenna array 150 are typically designated by m, where m runs from 0 to M−1. Beamformed samples are the weighted samples that will be sent to each antenna. The samples, prior to weighting, are contained in a vector of L elements. There are various ways to determine the weights described by ORAN and 3GPP that may be employed. As the weights may be supplied from the DU, as noted above, the actual determination of the values of the weights is not of particular relevance to the instant disclosure.

For example, where L=8 and M=64, the digital beamforming operation can be mathematically described as a matrix-by-vector multiplication as shown in equation (1)

$$Y^t = W^{tT} \cdot X^t \qquad (1)$$

where:

$$X^t = [x_0^t x_1^t \ldots x_1^t]^T$$

represents a vector of the 8 samples x of the respective data streams at time instant t so that there is a total of 64 samples that are fed to the beamforming operation performed by processor 110 and $$Y^t = [y_0^t y_1^t \ldots y_{63}^t]^T$$

represents the vector of the beamformed samples at time instant t. These samples are fed to communications interface 115, described further hereinbelow, and undergo further processing steps before being transmitted over the air through the respective M=64 antenna elements of antenna array 150. The symbol T indicates the matrix conjugate transpose, also known as the Hermitian transpose.

The weight matrix $$W^t = \begin{bmatrix} w_{0,0}^t & \cdots & w_{0,63}^t \\ \vdots & \ddots & \vdots \\ w_{7,0}^t & \cdots & w_{7,63}^t \end{bmatrix}$$

contains L×M, e.g., 512, beamforming weights, when M=64 and there are L=8 layers. These beamforming weights are used in the transmit direction to generate M beamformed values, each respective value beamformed being for a transmit branch and destined to have a version thereof transmitted by a respective one of the antenna elements of antenna array 150. In the receive direction of RU 100, i.e., where signals are received at antenna array 150 and are being processed by processor 110 and sent on to the distributed unit, the same weight matrix which is received through the communications interface 115, is applied to the vector $Y^t$ which has M samples, e.g., M=64, where each sample is associated with a respective signal received at one of the antenna elements of antenna array 150 at time instant t, in order to produce the vector $X^t$ of the receive samples of the respective L=8 layers, as described in equation (2):

$$X^t = W^t \cdot Y^t \quad (2)$$

Subsequently, the sequence of vectors $X^t$ undergoes the upper PHY operations to produce L received data streams that are to be supplied to the distributed unit.

Communications interface 115 may be a high throughput Serializer/De-serializer (SerDes) bus that connects processor 110 with a bank of LPHY processors 120, e.g., LPHY-0 120-0 through LPHY-15 120-15, which perform low physical layer (low PHY) operations. Such low PHY operations include, for example, time domain operations of an OFDM modem on M communications channels associated with respective M antenna elements. Each of LPHY processors 120 may process several communications channels. The number of communications channels processed by each LPHY processor 120 is indicated by a value K1, K1 being greater than or equal to two. For example, a total of M=64 channels may be processed by 16 LPHY processors 120, each of LPHY processors 120 processing K1 channels, where, for example, K1=4.

Each of LPHY processors 120 communicate with a respective one of frequency up/down converters (UDC) 130, e.g., (UDC) 130-0 through UDC 130-15. In the transmit direction, each of UDCs 130 applies a frequency up-conversion to the signals received from its corresponding respective one of LPHY processors 120 to the desired transmit radio frequency (RF) so that the M data streams produced by the LPHY processors are up converted. K1 data streams come from each LPHY processor. In the receive direction, each of UDCs 130 applies a frequency down-conversion to the received RF signals and collectively they produce M baseband data streams that are fed to the LPHY processors 120. The number of communications channels processed by each UDC 130 is indicated by a value K2, K2 being greater than or equal to two. The value of K2 may be different from K1. For example, a total of M=64 channels may be processed by 16 UDCs 130 with each UDC 130 processing K2 channels, where, for example, K2=4.

The values of K1 and K2 are at the discretion of the implementer.

The functionality of UDCs 130 may be implemented digitally, e.g., by a digital processor, or by analog RF circuitry. In the former case, communication links C6-0 to C6-15 between the respective LPHYs 120 and UDCs 130 may be implemented as digital communications buses, while in the latter case communication links C6-0 to C6-15 between the respective LPHYs 120 and UDCs 130 may be implemented as M analog signal connection lines. In the latter case, for example, where M=64 and there are 16 LPHY processors 120 and 16 UDCs 130, each LPHY 120 is connected to each UDC 130 by 4 analog signal lines.

UDCs 130 communicate with bank of analog front-end (AFE) units 140. AFEs are well known in the art. In the transmit direction, each AFE unit of bank of AFE units 140, which are not individually shown, amplifies the signal it receives from a respective one UDCs 130 that is to be transmitted. Each AFE unit of bank of AFE units 140 then supplies the amplified signal it produced to a respective antenna element (AE) of antenna array 150, which is an array of M antenna elements, each of which is also referred to herein simply as an antenna. As such, in one embodiment, bank of AFE units 140 is made up of M individual AFE units.

In addition, in the receive direction, each AFE of bank of AFE units 140 amplifies a respective one of the M signals received by antenna array 150 before supplying them to UDCs 130. In some embodiments, individual AFE units may be coupled to more than one antenna of antenna array 150. Typically, in such a case, the antennas coupled to each AFE unit are adjacent antennas that may be treated as a single antenna. For pedagogical purposes herein, it can be considered that one antenna is respectively coupled to each AFE unit of bank of AFE units 140. In some embodiments, the AFE units of bank of AFE units 140 are arranged so that they are effectively functionally coupled on a one-to-one basis to a respective one of UCDs 130.

Communication links C7-0 to C7-15 C7-I between UDCs 130 and bank of AFE units 140 and communication links C8-0 to C8-15 between AFE units 140 and antenna array 150 are all implemented as M analog signal connection lines. Thus, each respective one of communication links C7 in the arrangement shown in FIG. 1 employing M=64 antennas actually reflects 4 distinct channels. Similarly, each respective one of communication links C8 in the arrangement shown in FIG. 1 employing M=64 antennas actually reflects 4 distinct channels.

Note that wherever a signal that is transmitted from a transmit antenna is referred to, in systems without antennas such phraseology may be considered to refer to a signal supplied to a transmit branch or a branch leading to an antenna. Similarly, the number of transmit branches may be substituted for the number of transmit antennas.

Likewise, wherever a signal that originates at a receive antenna is referred to, in systems without antennas such phraseology may be considered to refer to a signal arriving at a receive branch or a branch leading from an antenna. Similarly, the number of receive branches may be substituted for the number of receive antennas.

Disadvantageously, the arrangement of FIG. 1 is computationally centralized in processor 110, which must be a computationally powerful processor as it must process all of the beamforming for all of the L data streams in both the transmit and receive directions.

Figure 2:
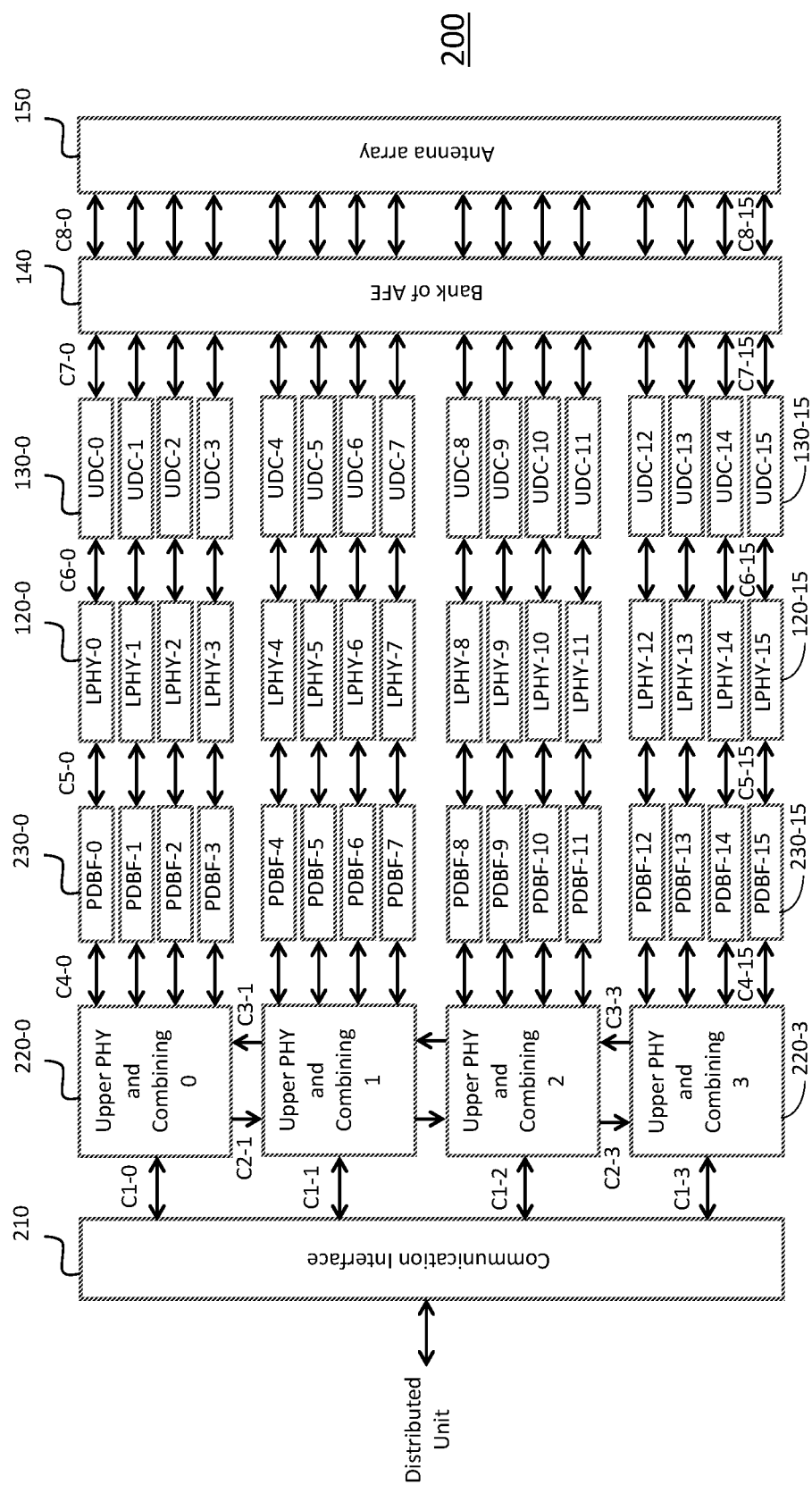
FIG. 2 shows an illustrative embodiment of radio unit (RU) for use in a communications system that uses distributed digital beamforming, in accordance with the principles of the disclosure.

FIG. 2 shows an illustrative embodiment of radio unit (RU) 200 for use in a communications system that uses distributed digital beamforming, in accordance with the principles of the disclosure. Shown in FIG. 2 are a) communication interface 210, b) upper PHY and combining processors 220-0 through 220-3, collectively herein upper PHY and combining processors 220, (c) LPHY processors 120, (d) UDCs 130, (e) bank of AFE units 140, (f) antenna array 150, and (g) partial digital beamforming (PDBF) processors 230-1 through 230-15. LPHY processors 120, UDCs 130, bank of AFE units 140 and antenna array 150 are as described hereinabove. However, in accordance with an aspect of the disclosure, the beamforming operation is primarily split among PDBF processors 230. The number of PDBF processors 230 is generally indicated by a value P. In the illustrative embodiment shown in FIG. 2 for example P=16 and so there are PDBF processors PDBF-0 230-0 through PDBF-15 230-15 shown in FIG. 2. The number of PDBF processors 230, i.e., the value of P, is at the discretion of the implementer. It may be selected as a tradeoff between the speed of the chip used to implement the PDBF processors 230 and the cost of the chip. There should be at least two PDBF processors 230 for each of upper PHY and combining processors 220. In some embodiments, each upper PHY and combining processor 220 may be integrated with its corresponding ones of PDBF processors 230. Such may be achieved regardless of the architecture of upper PHY and combining processors 220 and PDBF processors 230, e.g., solely hardware or hardware executing software.

In the receive direction, each of PDBF processors 230 operates on a number K3, where K3≥2, of values y supplied from LPHY processors 120, where each value $y_m{}^t$ is derived through processing by the chain formed of one of AFE units of bank of AFE units 140, one of UDCs 130, and one of LPHY processors 120 from the signal received at time t by the corresponding respective one of the antenna elements m of antenna array 150. Each such chain may be referred to as a receive branch or a channel. Thus, each respective one of communication links C7 in the arrangement shown in FIG. 2 employing M=64 antennas actually reflects 4 distinct channels. Similarly, each respective one of communication links C8 in the arrangement shown in FIG. 2 employing M=64 antennas actually reflects 4 distinct channels.

Each of PDBF processors 230 performs one respective line of the calculations set forth in equation (3), which uses, as an example, a value of K3=4 and a value for the number of antennas elements M=64, as follows:

$$X_{0:3}^t = W_0^t y_0^t + \ldots + W_3^t y_3^t$$
$$X_{4:7}^t = W_4^t y_4^t + \ldots + W_7^t y_7^t$$
$$\vdots$$
$$X_{60:63}^t = W_{60}^t y_{60}^t + \ldots + W_{63}^t y_{63}^t \quad (3)$$

More specifically, the subscripts in each the equations indicate particular ones of the antenna elements of antenna array 150. As such, for PDBF-0 processor 230-0, the subscripts in the equations indicate antenna elements 0-3 to which PDBF-0 processor 230-0 is coupled, and PDBF-0 processor 230-0 performs the first line of equation (3), i.e., $$X_{0:3}{}^t = W_0^t y_0^t + \ldots + W_3^t y_3^t,$$

For PDBF-1 processor 230-1, which is coupled to antenna elements 4-7, PDBF-1 processor 230-1 performs the second line of equation (3), i.e., $$X_{4:7}{}^t = W_4^t y_4^t + \ldots + W_7^t y_7^t$$

and so forth with PDBF-15 processor 230-15, which is coupled to antenna elements 60-63, performing the last line of equation (3), i.e., $$X_{60:63}{}^t = W_{60}^t y_{60}^t + \ldots + W_{63}^t y_{63}^t,$$

In other words, each resulting $X_{m:m+K3-1}{}^t$ is a sum of K3, e.g., K3=4, vectors of L elements where each of the L element vectors is formed by multiplying each sample $y_m$ received at a particular antenna m at time t by a respective associated weight vector $W_i^t$ having L, e.g., L=8, weight elements. Thus, there is a calculation of P=16 sums, also referred to herein as partial sums given that they are sums only for part of the antennas, where each partial sum is calculated in one of PDBF processors 230, e.g., the one associated with the antennas m specified for the partial sum. The weight vectors W are defined as follows, there being one weight vector W for each antenna m, where, in this illustrative embodiment, the number of antennas m=64:

$$W_i^t = [w_{0,i}{}^t \ w_{1,i}{}^t \ \ldots \ w_{7,i}{}^t]^T, \ i=0, 1, \ldots, 63$$

Thus, there are L×M weight values and, in this illustrative embodiment, where L=8 and M=64, there are again 512 weight values altogether.

Note that only K3 weight vectors are supplied to each of PDBF processors 230. Also, the update rate of these weight values is relatively low in practice as compared with the communication rate between communication interface 210 and the distributed unit, e.g., less than 10 KHz for the former as compared to 25 Gbps or higher for the latter. Again, as explained hereinabove, the weights are determined elsewhere, e.g., in the distributed unit, and communicated therefrom via the link to communication interface 210 and from there to the proper one of PDFBs 230.

The result is that each one of PDFB processors 230 creates a vector of 8 elements.

The partial sums $X_{0:3}{}^t, X_{4:7}{}^t, \ldots, X_{60:63}{}^t$ are supplied to ones of upper PHY and combining processors 220, as described further hereinbelow, where the received beamformed signal at time instant t, $X^t$, is produced according to equation (4):

$$X^t = X_{0:3}{}^t + X_{4:7}{}^t + \ldots + X_{60:63}{}^t \quad (4)$$

where each one of the partial sum terms being added is an 8 element vector, so that the result of the addition is a vector of the same size, i.e., 8 elements.

In practice, forming the received beamformed signal by upper PHY and combining processors 220 is performed in two stages. In the first stage, the following sums are computed, one at each of upper PHY and combining processors 220, as follows $$X_{0:15}{}^t = X_{0:3}{}^t + X_{4:7}{}^t + \ldots + X_{12:15}{}^t, \ldots, X_{48:63}{}^t = X_{48:51}{}^t + X_{52:55}{}^t + \ldots + X_{60:63}{}^t.$$

In other words, in each of the upper PHY and combining processors 220 the 4 partial sum vectors produced by the PDBF processors connected to it are added together. For example, in upper PHY and combining processor 220-0, the vectors produced by PDBF-0 230-0 through PDBF-3 230-3, are added together as follows:

$$X_{0:15}{}^t = X_{0:3}{}^t + X_{4:7}{}^t + \ldots + X_{12:15}{}^t.$$

The outputs of the other PDBF processors 220 are processed similarly by the other ones of upper PHY and combining processor 220 to which they are coupled. Thus, similarly, in upper PHY and combining processor 220-3, the 4 vectors produced by the ones of PDBF processors 220 connected to it, i.e., PDBF-12 processor 230-12 through PDBF-15 processor 230-15, are added together as follows:

$$X_{48:63}{}^t = X_{48:51}{}^t + X_{52:55}{}^t + \ldots + X_{60:63}{}^t.$$

Thus, the 16 partial sum 8 element vectors are combined into four 8 element vectors, one at each respective one of upper PHY and combining processors 220.

In the second stage, at least portions of the produced values of the four 8 element vectors are communicated among the different upper PHY and combining processors 220 processors in order to evaluate:

$$X^t = X_{0:15}{}^t + X_{16:31}{}^t + X_{32:47}{}^t + X_{48:63}{}^t$$

In some embodiments, to reduce the processing and communication burden, this evaluation is performed not by transmitting each vector produced by one of the upper PHY and combining processors 220 in its entirety to a central vector adder but rather only a subset of L/N consecutive ones of the x values that make up each of the vectors produced by one of the upper PHY and combining processors 220 are transmitted amongst the upper PHY and combining processor 220 and each upper PHY and combining processors 220 adds the corresponding consecutive ones of the subset of the x values of the vectors. Thus, each upper PHY and combining processor 220 produces a final value for only an L/N subset of the layers, and these final values are sent over links C1 to communications interface 210 which concatenates them into a vector of 8 layers and transmits that vector to the DU.

In the illustrative embodiment of FIG. 2, there are 4 upper PHY and combining processors 220. More generally, there will be N upper PHY and combining processors 220, where N is ≥2, and in FIG. 2, N=4. Upper PHY and combining processors 220 are collectively fed with P=M/K3 partial sums, given that in the example where each of PDBF processors 230 receives four y samples, one for each antenna element to which it is coupled, and four 8-element weight vectors from the weight matrix and it produces one 8-element vector for each received y sample. Thus, each of the upper PHY and combining processors 220 collectively receives P/N=4 vectors from the PDBF processors 230 to which it is connected.

Thus, in the embodiment shown in FIG. 2, there are 16 partial sums, and equation (4) is implemented in two stages to produce $X^t$, which is a vector of length L and includes the received data for L layers, i.e., L samples x that make up $X^t$. Upper PHY and combining processors 220 then share amongst themselves various ones of the L samples of the $X^t$ vector so that L/N samples are supplied to each one of the N upper PHY and combining processors 220, thus forming N sets of layers where each set has L/N layers.

For example, with L=8 and N=4, only two received beamformed samples are initially available at each upper PHY and combining processor 220 at each time instant t and therefore, two layers are processed by each of upper PHY and combining processors 220. The data of each of the 2 layers available at each of upper PHY and combining processors 220 undergoes the relevant upper PHY processing. Links C2-0 to C2-3, collectively links C2, and C3-0 to C3-3, collectively links C3, enable inter-processor communication between adjacent upper PHY and combining processors 220. Links C2 and links C3 are employed to enable the distribution of at least some of the information needed to determine the L elements of the $X^t$ vector.

Even though each upper PHY and combining processor 220 may only be directly connected to its nearest adjacent neighbors, data is propagated throughout the upper PHY and combining processors 220 to effectively implement a full mesh sharing network. To this end, each upper PHY and combining processor 220 keeps the data that it receives that it needs and propagates the rest, as well as the data it developed itself, to its nearest neighbors. Thus, data is transmitted "downward" in the direction from upper PHY and combining processor 220-0 toward upper PHY and combining processor 220-3 over links C2-1 to C2-3 and "upward" in the direction from upper PHY and combining processor 220-3 toward upper PHY and combining processor 220-0 over links C3-1 to C3-3. In some embodiments, bidirectional links or virtual link implemented by software executing on hardware may be employed.

In one embodiment, equation (4) is implemented in three phases by upper PHY and combining processors 220. First, each of upper PHY and combining processors 220 sums the length-L $X_{n:n+3}^t$-vectors that relate to the antennas coupled to this processor, where n is the number of one of upper PHY and combining processors 220, e.g., n ranging from 0 to N−1. In the illustrative embodiment of FIG. 2, there are M/4=64/4=16 AE in order to produce a partial sum length-L vector. Second, the partial sum produced at each upper PHY and combining processors 220 is split into N sections, each section comprising L/N consecutive samples. The $n^{th}$ length-L/N section produced by each of upper PHY and combining processors 220 must be arranged to become located at the $n^{th}$ one of upper PHY and combining processors 220. Each $n^{th}$ upper PHY and combining processor 220-n stores the $n^{th}$ length-L/N section it requires and transmits all other sections to all the other upper PHY and combining processors 220, so that eventually each upper PHY and combining processor 220 has access to all N of the length-L/N sections that were computed by each of the other ones of upper PHY and combining processors 220. Third, each upper PHY and combining processor 220 adds the N $n^{th}$ length-L/N sections in order to produce the outcome of equation (4) that refers to the $n^{th}$ length-L/N section of $X^t$.

Note that the calculation described by equations (3) and (4) is equivalent to the beamforming equation (2), which was used in the prior art embodiment of FIG. 1 with regard to the receive direction, since equation (2) is equivalent to the equation below:

$$X^t = [\, W_0^t \quad W_1^t \quad \ldots \quad W_{63}^t \,] \cdot \begin{bmatrix} y_0^t \\ \vdots \\ y_{63}^t \end{bmatrix}$$

Communication interface 210 is used to aggregate and dis-aggregate the layer data communicated between upper PHY and combining processors 220 and the DU. Communication interface 210 can be thought of as a gateway that packs and unpacks the data being communicated between the DU and RU 200. More specifically, communication interface 210 provides received information to the proper unit of RU 200, e.g., the proper one of upper PHY and combining processors 220, and it will receive information from upper PHY and combining processors 220 and pack and transmit same toward the DU. Such packing and unpacking may be performed so as to be able to communicate over the Internet or other suitable network. Other information required for operation of RU 200 or the DU may be communicated via communication interface 210. In some embodiments, communication interface 210 may be a router-like device.

In the transmit direction, at each time instant t, the DU supplies an L layer transmit data vector $X^t$, e.g., a vector made up of 8 samples $x_i$, i=0 to 7, to communication interface 210. In one embodiment, communication interface 210 dis-aggregates this input into L/N sets of layers, where, again, L is the number of layers and N is the number of upper PHY and combining processors 220. For example, when L=8 and N=4 each layer set comprises 2 layers. One layer set is fed to each one of upper PHY and combining processors 220. Each of upper PHY and combining processors 220 receives as an input the data of a layer set comprising L/N layers and performs upper PHY operations on them, producing L/N samples at each time instant t. The produced samples are distributed among upper PHY and combining processors 220 via interconnections C2 and C3 so that each processor forms the vector of transmit samples from all layers $X^t$. Each upper PHY and combining processors 220 feeds $X^t$ to the PDBF processors 230 attached to it. Each of PDBF processors 230 attached to a particular upper PHY and combining processor 220 receives the same information.

In one embodiment, the L sample vector received from the DU may be copied and distributed by communications interface 220 to each of upper PHY and combining processors 220.

Each of PDBF processors 230 applies a beamforming operation on their received input using a respective one of equations (5), where the weight values are the same as the ones used in the receiver path and the example values of M=64 and K3=4 are used. Note that each $Y_{m:m+3}^t$ is actually a vector of K3=4 scalars, one for each antenna element m to which the PDBF is coupled in a chain and each weight vector $W_i$, i=0 to i=M=63, is a vector made of a subset of weights of a weight array supplied from the DU, each weight vector having the same number of elements L. Each scalar is fed through a respective chain from the one of PDBF processors 230 that produced it to a corresponding respective antenna element of antenna array 150.

$$Y_{0:3}^t = \begin{bmatrix} W_0^{tT} \\ \vdots \\ W_3^{tT} \end{bmatrix} \cdot X^t, \quad (5)$$

$$Y_{4:7}^t = \begin{bmatrix} W_4^{tT} \\ \vdots \\ W_7^{tT} \end{bmatrix} \cdot X^t,$$

$$;$$

$$.$$

$$;$$

$$Y_{60:63}^t = \begin{bmatrix} W_{60}^{tT} \\ \vdots \\ W_{63}^{tT} \end{bmatrix} \cdot X^t$$

Note that the calculations described by equations (5) are equivalent to the original transmitter beamforming equation (1), since (1) is equivalent to the equation below:

$$\begin{bmatrix} Y_{0:3}^t \\ \vdots \\ T_{60:63}^t \end{bmatrix} = \begin{bmatrix} W_{60}^{tT} \\ \vdots \\ W_{63}^{tT} \end{bmatrix} \cdot X^t$$

Each of the outputs of each of PDBF processors 230, of which there are M divided by the number of PDBF processors, so that in total there are M outputs of the PDBF processors 230, undergoes further processing in respective ones of LPHY processors 120, UDCs 130, and bank of AFE units 140 before being fed to a respective antenna element of antenna array 150 for transmission over the air as described hereinabove with regards to FIG. 1.

Note that any specific numbers of data streams L, number of antennas M, numbers K1 or K2 of communications channels processed by each LPHY processor 120 and UDC 130, and number K3 of samples supplied from LPHY processors 120 are to be considered as examples only for pedagogical purposes. Those of ordinary skill in the art will be able to determine appropriate values of these numbers for systems they wish to design for any particular application.

In some embodiment PDBFs 230 are not necessarily independent physical units as their functionality may be incorporated into upper PHY and combining processors 220 or LPHY processors 120.

In some embodiments, the transmit direction and the receive direction may be implemented in at least partially separate paths, e.g., using a first group of upper PHY and combining processors to implement the transmit directions and using a second group, having at least one upper PHY and combining processor different from the first group, to implement the receive path.

Figure 3:
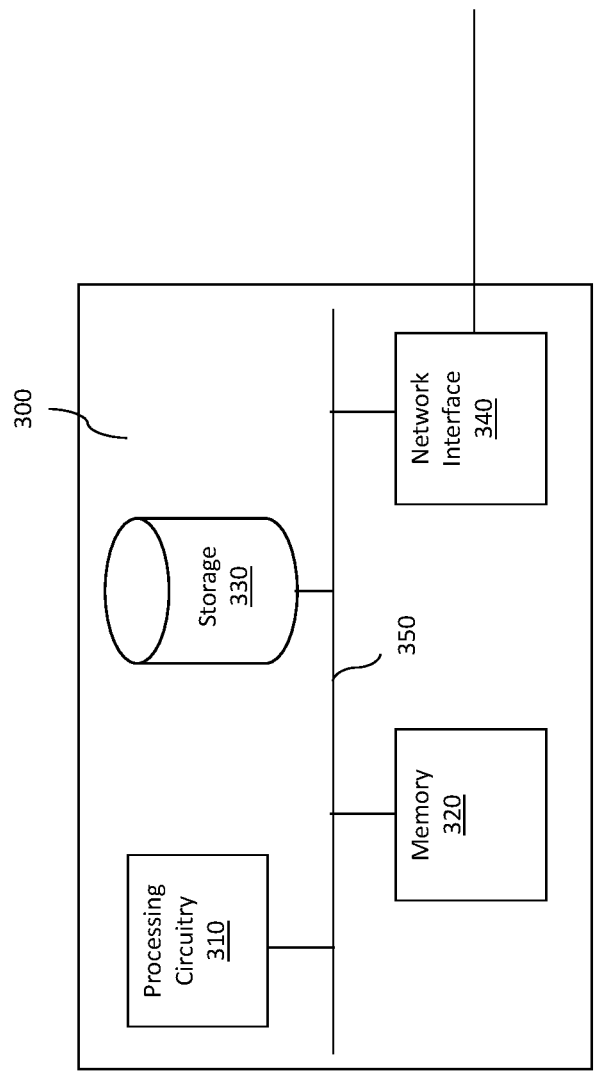
FIG. 3 is an illustrative schematic diagram of a system according to an embodiment.

FIG. 3 is an illustrative schematic diagram of a system 300 according to an embodiment. System 300 may be employed to implement any component of RU 200 that performs digital processing, e.g., aggregating device 210, upper PHY and combining processors 220, and LPHY processors 120. System 300 includes a processing circuitry 310 coupled to a memory 320, a storage 330, and a network interface 340. In an embodiment, the components of system 300 may be communicatively connected via a bus 350.

Processing circuitry 310 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

Memory 320 may be volatile (e.g., random access memory, etc.), non-volatile (e.g., read only memory, flash memory, etc.), or a combination thereof.

In one configuration, software for implementing one or more embodiments disclosed herein may be stored in storage 330. In another configuration, memory 320 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by processing circuitry 310, cause processing circuitry 310 to perform the various processes described herein.

Storage 330 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

Network interface 340 allows system 300 to communicate with other components of RU 200 that are either internal or external to system 300. For example, network interface may implement communication links C1, C2, C3, C4, C5, and C6 of RU 200. Thus, for example, if each upper PHY and combining processors 220 are implemented by system 300, then network interface 340 may implement communication links C1, C2, C3, and C4.

It should be understood that the embodiments described herein are not limited to the specific architecture illustrated in FIG. 3, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A radio unit for massive multiple input and multiple output (mMIMO) communications, comprising:
   M antenna branches;
   a plurality of partial digital beamforming (PDBF) processors, each of the partial digital beamforming processors receiving a transmit vector comprising values for each of L data layers, to be transmitted for a time t from the radio unit via the antenna branches, wherein each of the plurality of partial digital beamforming processors performs a beamforming operation on the transmit vector by multiplying the transmit vector with each of a plurality of respective weight vectors, the weight vectors each being a subset of a received weight array, to produce a plurality of scalar values, each of the scalar values corresponding to one of the weight vectors and being supplied to a respective one of the antenna branches; and
   a plurality of N upper physical layer (PHY) processors, N being an integer greater than one, the upper PHY processors being arranged to effectively communicate with each other as if configured in a complete mesh, each upper PHY processor initially receiving less than all of the data layers of the transmit vector and communicating with at least one other of the upper PHY processors so as to collect the entirety of the transmit vector which is supplied to a plurality of PDBF processors;
   wherein a number of the plurality of scalar values produced by any particular one of the partial digital beamforming processors is equal to a number of the plurality of weight vectors by which the transmit vector is multiplied in the particular one of the partial digital beamforming processors and a total number of scalar values produced is equal to M; and
   wherein L and M are each an integer greater than one.

2. The radio unit of claim 1, wherein the transmit vector was supplied from a distributed unit via a communications link.

3. The radio unit of claim 1, wherein the weight array was supplied from a distributed unit via a communications link.

4. The radio unit of claim 1, wherein at least one of the upper physical layer (PHY) processors supplies the transmit vector to a plurality of the partial digital beamforming processors.

5. The radio unit of claim 1, wherein the upper PHY processors perform upper PHY processing and at least one of the upper physical layer (PHY) processors supplies the transmit vector to a plurality of the partial digital beamforming processors.

6. The radio unit of claim 1, wherein at least one of the antenna branches comprises:
   a lower physical layer (PHY) processor adapted to perform orthogonal frequency multiplexing division (OFDM) time domain functionality, the lower PHY processor being connected to receive a scalar value from one of the plurality of PDBF processors and supplying a version thereof as an output;
   a frequency upconverter attached to and receiving input from the lower PHY processor, the frequency upconverter upconverting its respective received input and supplying an upconverted version of its input as an output;
   an analog front end processor, the analog front end processor receiving as an input the upconverted output supplied from the frequency upconverter and supplying as an output an amplified version of the received upconverted input; and
   an antenna element that receives the amplified output from the analog front end processor.

7. The radio unit of claim 1, wherein at least one PDBF processor performs beamforming according to:

$$Y_{n:n+j}^t = \begin{bmatrix} W_n^{tT} \\ \vdots \\ W_{n+j}^{tT} \end{bmatrix} \cdot X^t,$$

where
$X^t$ is the transmit vector;
W is the weight array;

n is a starting row in W;

n+j is an ending row in W;

Y is a produced scalar value; and

T means transpose conjugate.

8. A radio unit for massive multiple input and multiple output (mMIMO) communications, comprising:

M antenna branches;

a plurality of partial digital beamforming (PDBF) processors, each of the partial digital beamforming processors receiving (i) a plurality of antenna branch values, each of the antenna branch values being derived from a respective one of the M antenna branches, and (ii) a plurality of respective weight vectors, the weight vectors having a dimension L and each weight vector being a respective subset of a received weight array, to produce a vector of L weighted values for each of the received antenna branch values, wherein each of the PDBF processors adds together each of the vector of L weighted values it produced to generate a per-PDBF-processor vector that has L weighted values; and a plurality of N upper physical layer (PHY) processors, N being an integer greater than one, the upper PHY processors performing upper PHY processing, each of the upper PHY processors being coupled to a plurality of the PDBF processors, none of the PDBF processors being coupled to more than one of the upper PHY processors;

wherein L and M are each an integer greater than one.

9. The radio unit of claim 8, wherein the plurality of antenna branch values are each scalar values.

10. The radio unit of claim 8, wherein the respective subsets of the received weight array are disjoint and wherein the subsets collectively contain all of the weight elements of the received weight array.

11. The radio unit of claim 8, wherein at least one of the antenna branches comprises:

an antenna element that receives a wireless signal and supplies an electrical version thereof as an output;

an analog front end, the analog front end receiving the electrical version of the wireless signal from the antenna element and supplying as an output an amplified version thereof;

downconverter receiving as an input the amplified version of the electrical version of the wireless signal and supplying as an output a downconverted version of the amplified electrical version of the wireless signal; and a lower physical layer (PHY) processor adapted to perform orthogonal frequency multiplexing division (OFDM) time domain functionality, the lower PHY processor being connected to receive the downconverted version of the amplified electrical version of the wireless signal and to supply as an output to one of the PDBF processors to which it is coupled the antenna branch value for the at least one of the antenna branches.

12. The radio unit of claim 8, wherein each PDBF processor performs:

$$X_{m:m+j}^{t} = W_{m}^{t} y_{m}^{t} + \ldots + W_{m+j}^{t} y_{m+j}^{t}$$

to generate the per-PDBF-processor vector that has L weighted values, wherein:

$X_{m:m+j}^{t}$ is a partial sum vector for one of the PDBF processors m is a starting antenna index;

m+j is an ending antenna index;

W is the weight array;

each $y_m$ is an antenna branch value from antenna branch n, and t is a time index.

13. The radio unit of claim 8, wherein the upper PHY processors are arranged to effectively communicate with each other as if configured in a complete mesh to exchange samples produced by the upper PHY processors.

14. A radio unit for massive multiple input and multiple output (mMIMO) communications, comprising:

M antenna branches;

a plurality of partial digital beamforming (PDBF) processors, each of the partial digital beamforming processors receiving (i) a plurality of antenna branch values, each of the antenna branch values being derived from a respective one of the M antenna branches, and (ii) a plurality of respective weight vectors, the weight vectors having a dimension L and each weight vector being a respective subset of a received weight array, to produce a vector of L weighted values for each of the received antenna branch values, wherein each of the PDBF processors adds together each of the vector of L weighted values it produced to generate a per-PDBF-processor vector that has L weighted values; and a plurality of N upper physical layer (PHY) processors, N being an integer greater than one, each of the upper PHY processors being coupled to a plurality of the PDBF processors, none of the PDBF processors being coupled to more than one of the upper PHY processors, wherein each respective one of the upper PHY processors adds together the per-PDBF-processor vector that has L weighted values generated by the respective ones of PDBF processors that are coupled to it, whereby N vectors of L values are collectively produced by the upper PHY processors;

wherein L and M are each an integer greater than one.

15. The radio unit of claim 14, wherein the upper PHY processors combine the N vectors of L values that are collectively produced by the upper PHY processors to produce a single output vector of L values.

16. The radio unit of claim 15, further comprising a communications interface, and wherein the single output vector is transmitted from the radio unit by the communications interface.

17. The radio unit of claim 16, wherein the radio unit obtains N sections of L/N values at different, adjacent, and disjoint positions of the single output vector from each of the upper PHY processors and combines them for transmission as the single output vector.

18. The radio unit of claim 14, wherein the upper PHY processors exchange L/N different, adjacent, and disjoint sections of the N vectors of L values produced by each of the upper PHY processors so as to cause each upper PHY processor to have all samples from all upper PHY processors of one of the sections.

19. The radio unit of claim 18, comprising a communications interface, wherein each upper PHY processor adds together the N samples of each sample position of the one of the sections for which it has all of the samples and supplies a resulting total of each sample position of each respective section as L/N output samples to the communications interface, wherein the communications interface concatenates the resulting total of each sample position of each respective section into a single output vector having L samples.

* * * * *